Jan. 14, 1930.  W. M. FROST  1,743,664
INSECT TRAP
Filed Nov. 15, 1927
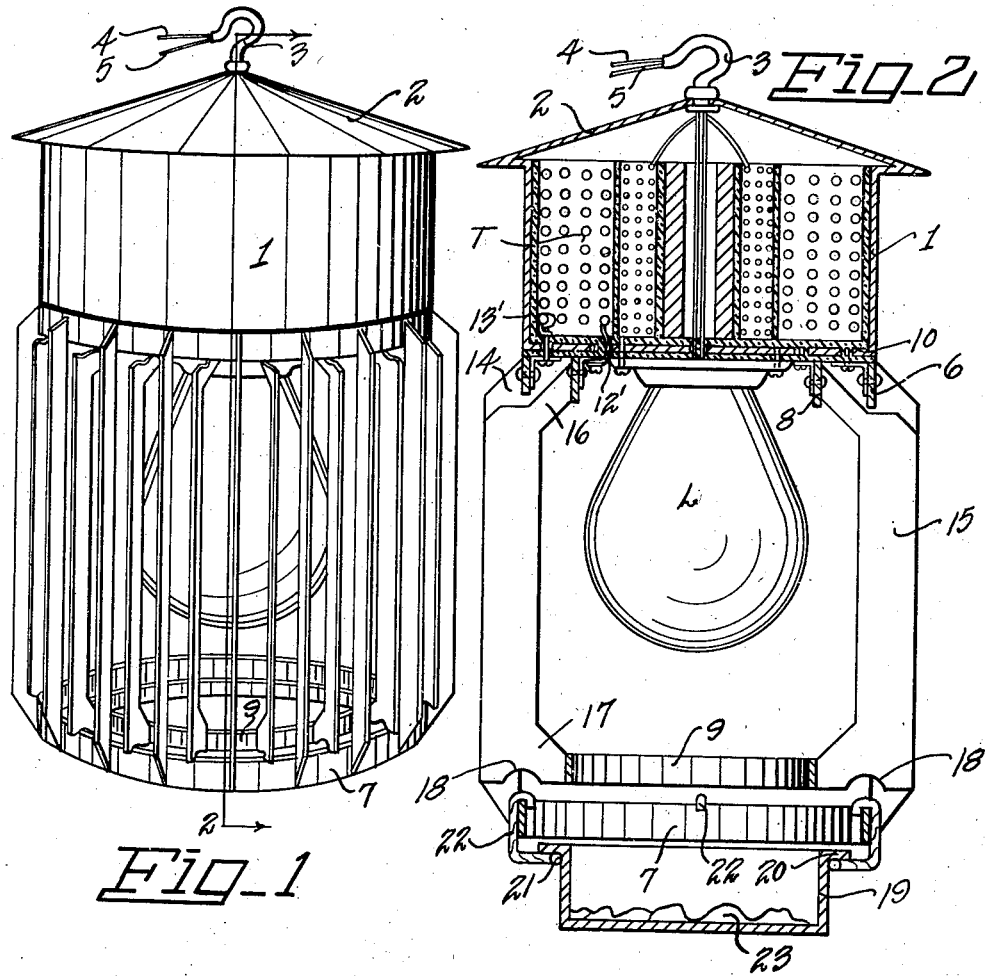
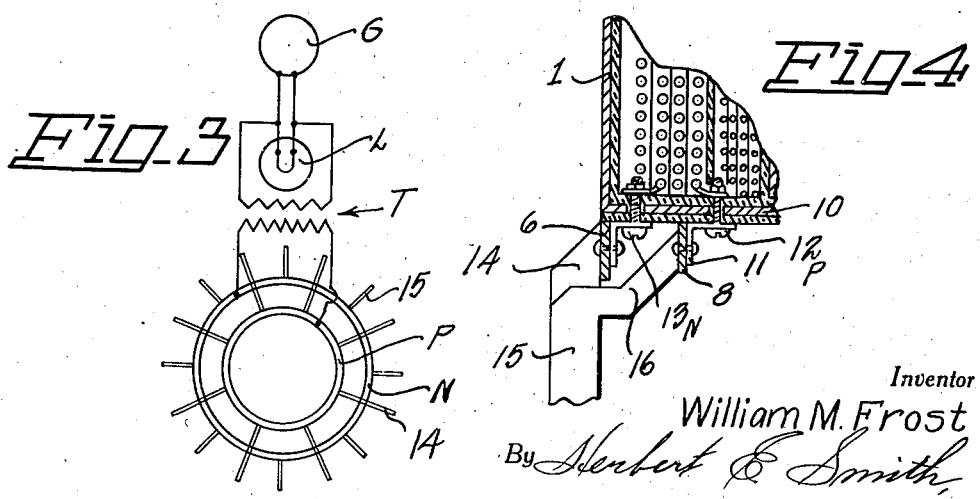
Inventor
William M. Frost
By 
Attorney Patented Jan. 14, 1930

1,743,664

UNITED STATES PATENT OFFICE

WILLIAM M. FROST, OF SPOKANE, WASHINGTON

INSECT TRAP

Application filed November 15, 1927. Serial No. 233,403. REISSUED

My present invention relates to improvements in insect traps of the electrocuting type and designed for the extermination of flies and other insects that may come in contact with the opposed electrodes of the electrocuting trap. The device of my invention is designed as a probable trap which may be suspended or hung up from suitable supports in desired places, and the device may be equipped with a lamp to attract the insects at night time and a bait or lure is also used for the purpose of attracting the insects to the electrocuting members of the trap. Means are provided for gathering the electrocuted insects, and the device is especially designed to provide a compact, simple, and durable structure for this purpose which is not likely to get out of order or deranged as to its relative parts. The invention consists in certain novel combinations and arrangements of parts involving the electrodes that form the trap, all as will hereinafter be more fully pointed out and claimed.

In the accompanying drawings, I have illustrated one complete example of the physical embodiment of my invention wherein the parts are combined and arranged according to the best mode I have so far devised for the practical application of the principles of my invention.

Figure 1 is a perspective view of an electrocuting trap involving my invention;

Fig. 2 is a vertical sectional view as at line 2—2 of Fig. 1;

Fig. 3 is a view showing a diagrammatic arrangement of the electrical parts of the trap; and Fig. 4 is an enlarged detail sectional view showing part of the electrical transformer and parts of the positive and negative blades of the electrodes.

Referring particularly to Fig. 3 where the electrical parts are designated, I utilize a generator G and an illuminating lamp L, and employ a transformer T in connection with the electrodes which I have designated as P and N for the positive and negative members respectively.

The transformer T is preferably enclosed in a cylindrical shaped housing 1 and above this housing is provided a circular conical shaped overhanging top 2 above which is located a suspension hook 3 preferably made in tubular form to accommodate the electric wires 4 and 5 from the generator to the transformer, and also to the lamp.

The trap forming the lower part of the device includes an upper ring 6 and a lower ring 7 together with an upper ring 8 of smaller diameter and a lower ring 9 of smaller diameter than the ring 7. The rings 6 and 8 and 7 and 9 are arranged concentrically, and the upper rings 6 and 8 are attached to an insulated plate 10 on the bottom of the transformer. Brackets 11 are attached to the plate 8 and to the rings 6 and 8, and screws 12 and 13 are passed through the brackets and lead into the coils of the transformer and have attached thereto the conductor wires as 12' and 13'.

The upper band or ring 6 and the lower ring 7 are joined by vertically arranged blades 14 which project radially and outwardly from these bands, and the two inner bands or rings 8 and 9 of smaller diameter are joined by blades 15 which also project radially from the center of the trap. These blades 15 have attaching angle members 16 and 17 at their upper and lower ends and these members or lugs provide means whereby the blades 15 are positioned complementary to the blades 14. The blades 14 have positive connections and the blades 15 have negative connections so that these two electrodes will serve to electrocute an insect attempting to fly between adjoining blades, when the insect contacts with each of the blades. Thus the blades as indicated in Fig. 3 are wider apart at their outer edges than they are at their inner edges and a fly entering the space between adjoining blades 14 and 15 is permitted to enter the space, but the tips of its wings will touch the adjoining blades of opposed energy and the fly is thus electrocuted. The blades are arranged in vertical planes and form a cage about the electric lamp L, which cage of course protects the lamp and at the same time forms the electrocuting trap for the insects. The lower ends of the blades 15 which are lengthened by the presence of the attaching lug 17, are provided with arcuate notches 18 which form deflecting or guiding edges to prevent drops of water from dripping down to the ring 7. In this manner, the possibility of the two electrodes being connected together by a conductor is eliminated, as the moisture running down the blade 15 is caused to drip therefrom at either the inside or the outside of the ring 7.

The insects entering the trap from the outside are electrocuted and because of the smooth adjoining surfaces of the blades the bodies fall downwardly without clinging to these smooth sides.

In addition to the use of the lamp L for attracting the insects, I may provide a bait in connection with the trap and for this purpose a pan or receptacle 19 of smaller diameter than the small lower ring 9 is provided. This pan has an exterior annular flange 20 and a supporting ring 21 under this flange is connected by hooks 22 and these hooks fit over the top edge of the larger lower ring 7 of the trap. The pan is thus suspended by four hooks as shown in Fig. 2, and a bait 23 of suitable material may be placed in the pan to attract the insects. The bait of course cannot be reached except by entrance through the spaces between the blades of the trap, and passage of the insects through these spaces is prevented when their wings or their bodies contact with the opposing electrodes, in which event they are electrocuted and fall to the ground.

Having thus fully described my invention, what I claim as new and desire to secure by Letters Patent is—

1. The combination in an electrocuting trap with a transformer and a housing therefor, of a trap in the form of a cage comprising a pair of spaced concentric upper rings and a pair of spaced concentric lower rings, the smaller of the lower rings being located above the larger ring, and radially extending, alternately arranged, positive and negative blades connecting the pair of outer rings and the pair of inner rings.

2. The combination in an electrocuting trap with a housing having a conical top and a suspending hook and an electrical transformer in the housing, of a pair of concentric rings attached at the under side of the housing, a pair of spaced concentric rings, the inner one of which is located above the lower one, alternately arranged and radially extending positive and negative blades connecting the upper and lower rings in pairs, said blades forming a cage, and a bait-containing receptacle supported beneath said cage.

In testimony whereof I affix my signature.

WILLIAM M. FROST.